J. G. VINCENT.
CLUTCH.
APPLICATION FILED APR. 15, 1913.

1,176,796.

Patented Mar. 28, 1916.
3 SHEETS—SHEET 1.

Witnesses
Inventor
J. G. Vincent

UNITED STATES PATENT OFFICE.

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN.

CLUTCH.

1,176,796.  Specification of Letters Patent.  Patented Mar. 28, 1916.

Application filed April 15, 1913. Serial No. 761,299.

*To all whom it may concern:*

Be it known that I, JESSE G. VINCENT, a citizen of the United States, residing at Detroit, Wayne county, State of Michigan, have invented certain new and useful Improvements in Clutches, of which the following is a specification.

The invention relates particularly to clutch mechanism for connecting the crank shaft of the motor with the transmission mechanism of a motor vehicle.

The objects of the invention are to simplify the construction of clutches heretofore used for this purpose and to generally improve the same by making the parts more accessible and more easily constructed and assembled.

Figure 1:
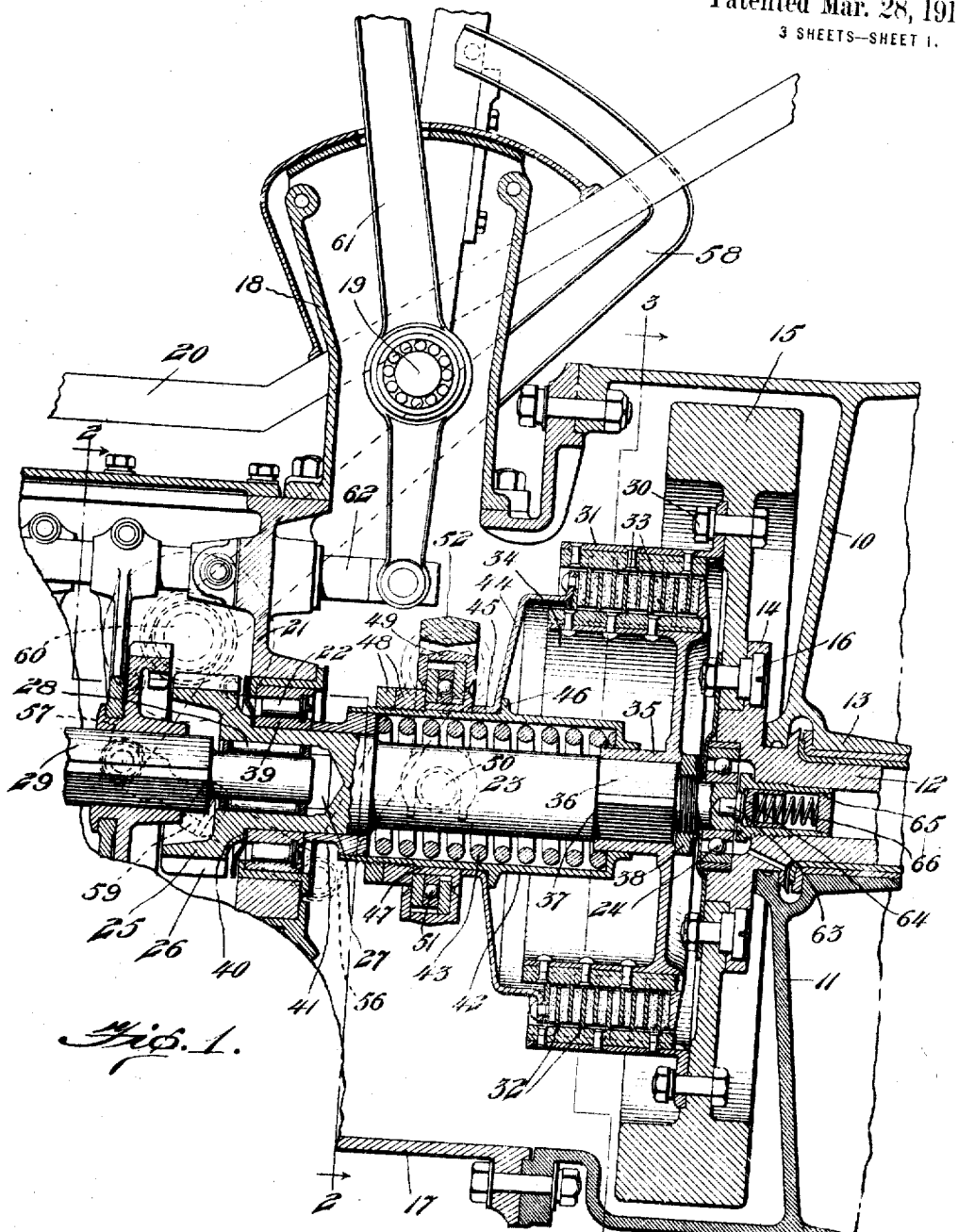
Figure 2:
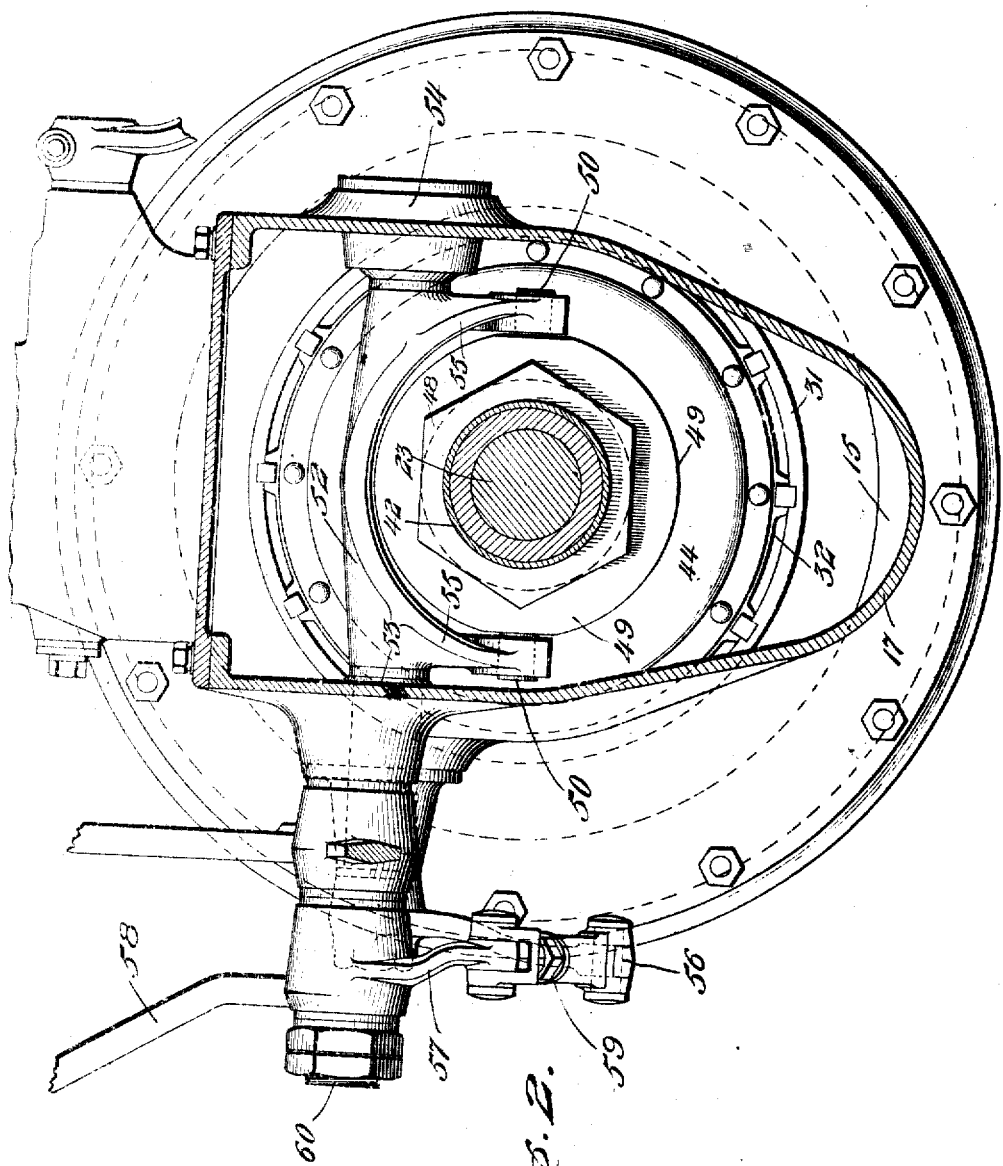
Figure 3:
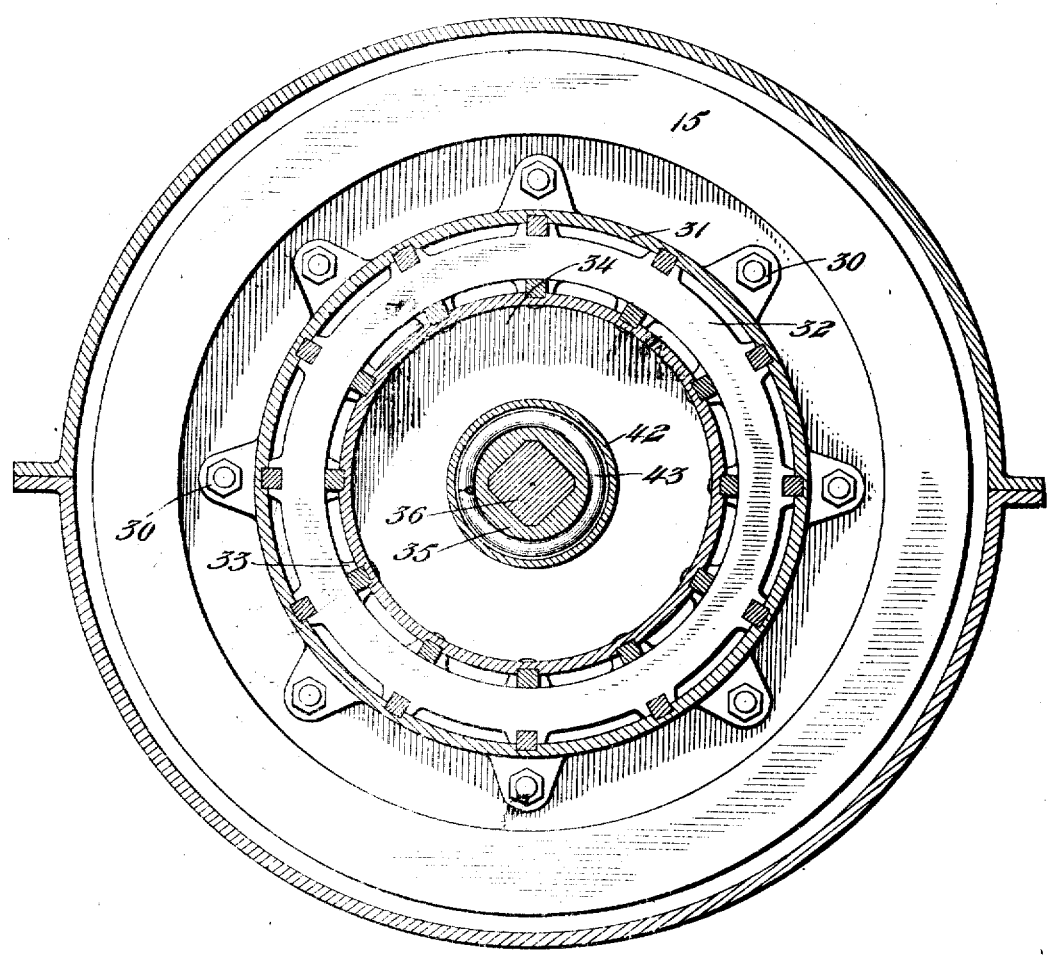

The features of novelty of the invention will be apparent from the following description taken in connection with the accompanying drawings, in which:

Figure 1 is a longitudinal section of a clutch mechanism embodying the invention and shown in connection with the crank shaft of the motor and a portion of the transmission mechanism. Fig. 2 is a transverse section on the line 2—2 of Fig. 1, certain parts being omitted for the purpose of more clearly illustrating other parts. Fig. 3 is a section on the line 3—3 of Fig. 1.

Referring to the drawing, 10 indicates the upper section of the crank case of a vehicle motor and 11 the bottom section thereof. The rearward end 12 of the crank shaft of the motor is carried in a bearing 13 arranged in the crank case sections 10 and 11 and is provided with a radially extending flange 14, to which is secured a fly wheel 15 by means of suitable bolts 16.

Secured to the crank case sections 10 and 11 is a casing 17 for the clutch mechanism, about to be described, and supported on the casing 17 is a housing or frame 18 which supports a shaft 19 and projects above the floor 20 of the vehicle. The rearward portion of the casing 17 forms a housing for the change speed gearing, a portion of which is shown at the left hand end of Fig. 1. Since the change speed mechanism forms no part of the present invention the same has been omitted from the drawings and therefore will not be described. The casing 17 is provided with a partition 21 in which is arranged a radial roller bearing 22 of any suitable construction and preferably adapted to take rearward thrust. A clutch shaft 23 is supported in the bearing 22 and a radial ball or roller bearing 24 arranged in a suitable recess in the end of the crank shaft 12. The rearward end of the clutch shaft 23 is formed with an enlargement 25 having the gear teeth 26 cut thereon and constituting one of the gears of the change speed mechanism. The shaft 23 is provided with a central recess 27 extending axially from the rearward end thereof and in which is arranged a roller bearing 28 which carries the forward end of the transmission shaft 29, the bearing 28 being substantially in line with the bearing 22, whereby the radial forces in the shaft 29 are transmitted to the partition 21.

The fly wheel 15 has secured thereto by means of suitable bolts 30 the casing 31, which carries the annular clutch disks 32 of the usual construction. The disks 32 rotate with the casing 31 and are alternately arranged with respect to the disks 33 which are carried by a spider 34. The spider 34 has its hub 35 arranged on the squared portion 36 of the shaft 23 and is held in position on the shaft by means of the shoulder 37 and the nut 38, the latter having threaded engagement with the end portion of the shaft.

The inner ring 39 of the bearing 22 is held between a shoulder 40 on the shaft 23 and a collar or sleeve 41. A sleeve 42 has its forward end in sliding engagement with the hub 35 of the spider 34 and its rearward end arranged on the sleeve 41 and incloses a helical spring 43, one end of which engages the collar 41 and the other end of which engages the forward end wall of the sleeve 42. The rearmost clutch disk has secured thereto the plate 44, this plate having a central flange 45 arranged on the exterior of the sleeve 42 which is held between a flange 46 on said sleeve and the shifter collar 47. The shifter collar 47 is arranged on a cylindrical portion of the sleeve 42 and is held thereon by the nuts 48 which have threaded engagement with the exterior of the sleeve. Surrounding the shifter collar 47 is a ring 49 provided with the usual trunnions 50 and having arranged between it and the shifter collar the usual thrust bearing 51. A yoke 52 carried on a suitable shaft or pivot having bearings 53 and 54 in the casing 17 is provided with arms 55 which engage the trunnions 50 so that when the yoke is rocked on its pivot it is adapted to move the sleeve 42 back and forth relative to the clutch shaft 23. Any suitable mechanism for rocking the yoke 52 may be provided and in the drawings I have indicated an arm 56 which is connected with an arm 57 of the pedal lever 58, by means of an adjustable link 59. The pedal lever 58 is pivoted on a stud shaft 60 which is carried by the casing 17.

The shaft 19 has arranged thereon a lever 61 which extends vertically through the housing 18 and is connected with a rod 62 for the purpose of shifting the change speed gears. This mechanism, however, forms no part of the present invention.

The clutch members are normally held in engagement for the purpose of transmitting power from the crank shaft 12 to the clutch shaft 23, by means of the spring 43. The rearward thrust of this spring is taken on the shoulder 40 through the inner ring 39 and the sleeve 41, and the forward thrust is taken through the disks 32 and 33 and the spider 34 to the nut 38. It will be understood, therefore, that the opposite end thrusts of the spring 43, when the clutch is engaged are transmitted to the shaft 23 and thus neutralize each other. However, when the clutch is disengaged, by moving the sleeve 42 rearwardly to compress the spring 43, the resulting rearward thrust is transmitted to the partition 21 of the clutch casing through the bearing 22. This bearing 22, however, is not adapted to take forward thrust which might be transferred to the clutch shaft by the operator pulling up on the pedal lever 58 to more firmly engage the clutch, and I have therefore provided a thrust bearing at the forward end of the clutch shaft, this bearing consisting of a hardened steel button or pivot 63, which engages a plunger 64 slidably arranged in a tubular member 65, this member being secured in the end of the crank shaft 12. A spring 66 is arranged in the tubular member 65 and engages the plunger 64 and presses the same rearwardly against the button 63 with sufficient pressure to counteract the forward thrust on the clutch parts. By using the spring 66 in connection with this thrust bearing, the clutch shaft 23 is constantly pressed toward the rear, to thereby keep a slight end pressure on the bearing 22 at all times, so that the clutch will not shuck back and forth between its bearings.

It will be obvious to those skilled in the art that various changes in the minor details of the invention may be made within the scope of the claims and therefore I do not wish to be limited to the exact details shown and described.

Having thus described the invention what is claimed as new is:

1. In a motor vehicle, the combination with the motor crank shaft, a clutch shaft having a bearing for one end thereof in said crank shaft, a bearing for the other end of the clutch shaft adapted to take radial thrust and axial thrust in one direction, clutch members adapted to form a driving connection between the crank and clutch shafts, and spring-pressed means co-acting with the crank and clutch shaft and adapted to co-operate with said second-mentioned bearing to hold the clutch shaft against axial movement.

2. In a motor vehicle, the combination with the motor crank shaft, of a clutch shaft alined therewith, clutch members adapted to form a driving connection between the crank and clutch shafts, one of said clutch members being secured on one end of the clutch shaft and having a hub, a collar arranged on the opposite end of the clutch shaft, and a tubular actuating member for the clutch having engagement with said hub and said collar and slidable axially thereon.

3. In a motor vehicle, the combination of a driving shaft, a clutch shaft, a clutch spider secured on the clutch shaft and having a hub, clutch disks adapted to form a driving connection between the driving shaft and said spider, a collar arranged on the clutch shaft, an axially movable tubular member having its ends engaging said collar and said hub, means connecting said tubular member with said clutch disks whereby the latter are operated by the movements of said member, and a spring arranged within said tubular member and adapted to normally hold said disks in gripping engagement.

4. In a motor vehicle, the combination of a driven shaft, a clutch shaft, friction members adapted to form a driving connection between the driving and clutch shafts, and means for operating the friction members comprising an axially movable tubular member surrounding the clutch shaft, opposed abutments on the exterior of said tubular member and one of which is removable, a plate adapted to connect said tubular member with said clutch members for actuating the latter and having a hub arranged between said abutments and prevented from moving axially on said tubular member by the abutments, and means for moving said tubular member.

5. In a motor vehicle, the combination of a driving shaft, a clutch shaft having an angular portion, a clutch spider having a hub fitting said angular portion, clutch members adapted to form a driving connection between the driving shaft and said spider, a nut engaging one end of the hub of said spider and adapted to secure the spider to the clutch shaft, and means for operating the clutch members.

6. In a motor vehicle, the combination of a driving shaft, a clutch shaft having a cylindrical portion and a squared portion smaller than the cylindrical portion and adjacent thereto whereby a shoulder is formed on said shaft, a spider having a hub arranged on the squared portion of the clutch shaft, a nut on the clutch shaft adapted to coöperate with said shoulder to hold the spider in position, clutch members adapted to form a driving connection between the driving shaft and the spider, and means for operating the clutch members.

In testimony whereof I affix my signature in presence of two witnesses.

JESSE G. VINCENT.

Witnesses:
MILO L. BAILEY,
LE ROI J. WILLIAMS.

It is hereby certified that in Letters Patent No. 1,176,796, granted March 28, 1916, upon the application of Jesse G. Vincent. of Detroit, Michigan, for an improvement in "Clutches," an error appears in the printed specification requiring correction as follows: Page 2, line 105, claim 4, for the word "driven" read *driving;* and that the said Letters Patent should be read with this correction therein that the same may conform to the record of the case in the Patent Office.

Signed and sealed this 18th day of April, A. D., 1916.

[SEAL.]

R. F. WHITEHEAD,
*Acting Commissioner of Patents.*

Cl. 192—10.